US008126404B2

(12) United States Patent
Ben Rached et al.

(10) Patent No.: US 8,126,404 B2
(45) Date of Patent: Feb. 28, 2012

(54) METHOD AND DEVICE FOR EVALUATING THE ENERGY LEVEL OF A RADIO SIGNAL

(75) Inventors: Nidham Ben Rached, Paris (FR); Thierry Lucidarme, Montigny le Bretonneux (FR); Arnaud De Lannoy, Versailles (FR)

(73) Assignee: Alcatel Lucent, Paris (FR)

( * ) Notice: Subject to any disclaimer, the term of this patent is extended or adjusted under 35 U.S.C. 154(b) by 2016 days.

(21) Appl. No.: 10/416,175

(22) PCT Filed: Nov. 7, 2001

(86) PCT No.: PCT/FR01/03451
§ 371 (c)(1), (2), (4) Date: May 8, 2003

(87) PCT Pub. No.: WO02/41539
PCT Pub. Date: May 23, 2002

(65) Prior Publication Data
US 2004/0097196 A1    May 20, 2004

(30) Foreign Application Priority Data
Nov. 14, 2000 (FR) ...................................... 00 14612

(51) Int. Cl.
*H04B 17/00* (2006.01)
(52) U.S. Cl. ............... 455/67.11; 455/67.15; 455/67.16; 455/115.1; 455/115.3; 455/423; 375/224; 375/227; 370/241; 370/253
(58) Field of Classification Search ............... 455/67.11, 455/67.15, 67.16, 115.1, 423, 115.3; 375/224, 375/227; 370/241–253
See application file for complete search history.

(56) References Cited

U.S. PATENT DOCUMENTS

| | | | | |
|---|---|---|---|---|
| 5,835,846 A | * | 11/1998 | Furukawa et al. | 455/10 |
| 6,310,645 B1 | * | 10/2001 | Lapushin et al. | 348/192 |
| 6,480,716 B2 | * | 11/2002 | Salonaho | 455/441 |
| 6,577,603 B1 | * | 6/2003 | Hakalin et al. | 370/252 |
| 6,600,934 B1 | * | 7/2003 | Yun et al. | 455/562.1 |
| 6,799,044 B1 | * | 9/2004 | Wesby et al. | 455/452.1 |

FOREIGN PATENT DOCUMENTS

| | | |
|---|---|---|
| FR | 2782227 | 2/2000 |
| WO | WO9816079 | 4/1998 |

OTHER PUBLICATIONS

Holtzman J.M., "Adaptive Measurement Intervals for Handoffs", Discovering a New World of Communications. Chicago, Jun. 14-18, 1992, Proceedings of the International Conference on Communications, New York, IEEE, US, vol. 2, pp. 1032-1036.

Austin M.D., et al., "Velocity Adaptive Handoff Algorithms for Microcellular Systems", IEEE Transactions on Vehicular Technology, IEEE Inc. New York, US, vol. 43, No. 3, Part I, Aug. 1, 1994, pp. 549-561.

(Continued)

*Primary Examiner* — Charles Appiah
*Assistant Examiner* — Jaime Holliday
(74) *Attorney, Agent, or Firm* — Sughrue Mion, PLLC

(57) ABSTRACT

To evaluate an energy level of a signal received through a radio interface between radiocommunication stations, successive measurement samples depending on the energy of the signal are obtained, and an average of said samples is calculated, to evaluate the energy level. The calculation of the average of the samples is performed with an averaging duration depending on a service to which the received signal pertains.

19 Claims, 3 Drawing Sheets

OTHER PUBLICATIONS

3G TS 25.433 V3.2.0 (Jun. 2000), 3$^{rd}$ Genaration Partnership Project; Technical Specification Group Radio Access Network; UTRAN lub Interface NBAP Signalling, Release 1999.

3G TS 25.331 V3.3.0 (Jun. 2000), 3$^{rd}$ Genaration Partnership Project; Technical Specification Group Radio Access Network; RRC Protocol Specification, Release 1999.

3G TS 25.211 V3.3.0 (Jun. 2000), 3$^{rd}$ Genaration Partnership Project; Technical Specification Group Radio Access Network;Physical channels and mapping of transport channels onto physical channels (FDD), Release 1999.

Laakso, et al., "Radio Resource Management", WCDMA for UMTS, edited by Harri Holma and Antti Toskala, 2000 John Wiley & Sons, Ltd, Chapter 9.

* cited by examiner

METHOD AND DEVICE FOR EVALUATING THE ENERGY LEVEL OF A RADIO SIGNAL

BACKGROUND OF THE INVENTION

The present invention relates to the energy measurements performed in mobile radiocommunication systems.

Such measurements are usable in particular in radio link control procedures which serve in a general manner to optimize the quality of the transmissions and to minimize the interference between users. Among these procedures mention may be made of the regulating of transmission power by the mobiles and/or by the infrastructure, the handover control in cellular networks, the adaptation of the channel coding to the propagation conditions, the adaptation of the source coding (in particular the case of variable rate speech encoders of AMR "Adaptive Multi-Rate" type), the link adaptation procedures, etc.

The efficiency of this kind of procedure depends on the availability of reliable energy measurements within as short a timespan as possible, so that suitable decisions can be taken fairly quickly.

Moreover, allowance for point-like measurement samples may disturb the control algorithms implemented, by reason of the short-term fluctuations of the propagation channel. This is why time smoothing of these samples is generally performed by means of an averaging window of duration equal to N times the period between samples. The window may be rectangular: an arithmetic average of the last N samples is then computed. It is common to employ an exponential window with a forgetting factor $\alpha=1/N$: upon receipt of an n-th sample C(n), a smoothed value $\overline{C}(n)=(1-\alpha)\cdot \overline{C}(n-1)+\alpha\cdot C(n)$ is then produced.

A long duration of the averaging window decreases the standard deviation of the estimate of the measured parameter, and therefore improves the reliability of the measurement. Conversely, a short duration increases the speed of acquisition of the measurements and therefore makes it possible, to the extent that they are reliable, to optimize the performance of the control algorithm which utilizes them. The choice of this duration results from a compromise between these two contradictory requirements.

An object of the present invention is to propose a finer way of making this compromise.

SUMMARY OF THE INVENTION

The invention thus proposes a method of evaluating an energy level of a signal received through a radio interface between radiocommunication stations, wherein successive measurement samples depending on the energy of the signal are obtained, and an average of said samples is calculated to evaluate the energy level. According to the invention, the calculation of the average of said samples is performed with an averaging duration depending on a service to which the received signal pertains.

In particular, the averaging duration may increase as a function of the information throughput carried by the signal received.

In a preferred embodiment of the invention, a speed of movement of one the stations is estimated, and the averaging duration likewise depends on the estimated speed.

The standard deviation of the energy level estimator depends on the duration of averaging and on the speed of the mobile station. It is generally a decreasing function of the duration of averaging and of the speed. By tailoring the duration of averaging as a function of speed, it is possible to target a particular value of standard deviation and hence to meet the requirements of a given application, such as a radio link control procedure.

The speed of movement of the mobile station may be estimated by various means. In an advantageous embodiment, it is estimated on the basis of the time variations of the measurement samples.

Another aspect of the invention relates to a device for evaluating an energy level of a signal received by a mobile radiocommunication station, comprising measurement means for obtaining successive samples depending on the energy of the signal, and means for calculating an average of said samples to evaluate the energy level, the average calculation means being controlled to cause a duration of averaging of the samples to depend on a service to which the received signal pertains.

A third aspect of the invention concerns a device for evaluating an energy level of a signal received by a fixed radiocommunication station from a mobile station, comprising measurement means for obtaining successive samples depending on the energy of the signal, and means for calculating an average of said samples to evaluate the energy level, the average calculation means being controlled to cause a duration of averaging of the samples to depend on a service to which the received signal pertains.

A fourth aspect of the invention concerns a method of evaluating an energy level of a signal received from a mobile station by a fixed station through a radio interface between said stations, wherein successive measurement samples depending on the energy of the signal are obtained, an average of said samples is calculated to evaluate the energy level, and a speed of movement of the mobile station is estimated, the calculation of the average of said samples being performed with an averaging duration depending on the estimated speed. According to this aspect of the invention, the average calculation comprises a first averaging performed in the fixed station with a first averaging duration less than said duration dependent on the estimated speed, and a second averaging performed in an item of equipment controlling the fixed station with said averaging duration dependent on the estimated speed.

DESCRIPTION OF PREFERRED EMBODIMENTS

The invention is described hereinbelow in its non-limiting application to code division multiple access (CDMA) cellular networks of UMTS (Universal Mobile Telecommunications System) type.

In a CDMA system, the symbols sent, binary ($\pm 1$) or quaternary ($\pm 1 \pm j$), are multiplied by spreading codes composed of samples, called "chips", whose rate is greater than that of the symbols. Orthogonal or quasi-orthogonal spreading codes are allotted to the various logical channels sharing the same carrier frequency, so as to allow each receiver to detect the sequence of symbols which is destined therefor, by multiplying the signal received by the corresponding spreading code.

The rake receiver performs coherent demodulation based on an approximation of the impulse response of the radio propagation channel by a series of peaks, each peak appearing with a delay corresponding to the propagation time along a particular path and having a complex amplitude corresponding to the attenuation and to the phase shift of the signal along this path (instantaneous realization of fading). By analyzing several reception paths, i.e. by sampling, several times, the output from a filter adapted to the spreading code of the channel, with delays corresponding respectively to these paths, the rake receiver obtains multiple estimates of the symbols sent, which are combined to obtain diversity gain. Combining can be performed in particular according to the so-called MRC (Maximum Ratio Combining) method, which weights the various estimates as a function of the complex amplitude observed for the various paths.

In order to allow this coherent demodulation, pilot symbols are provided for the estimation of the impulse response in the form of a succession of peaks. The impulse response is estimated by means of a filter matched to a particular spreading code, which may be the spreading code of the communication in progress or that allotted specially to a pilot channel, with which the transmitter modulates a sequence of known symbols, for example symbols set to 1. The positions of the maxima of the output from this matched filter give the delays used in the fingers of the rake receiver, and the associated complex amplitudes correspond to the values of these maxima.

Figure 1:
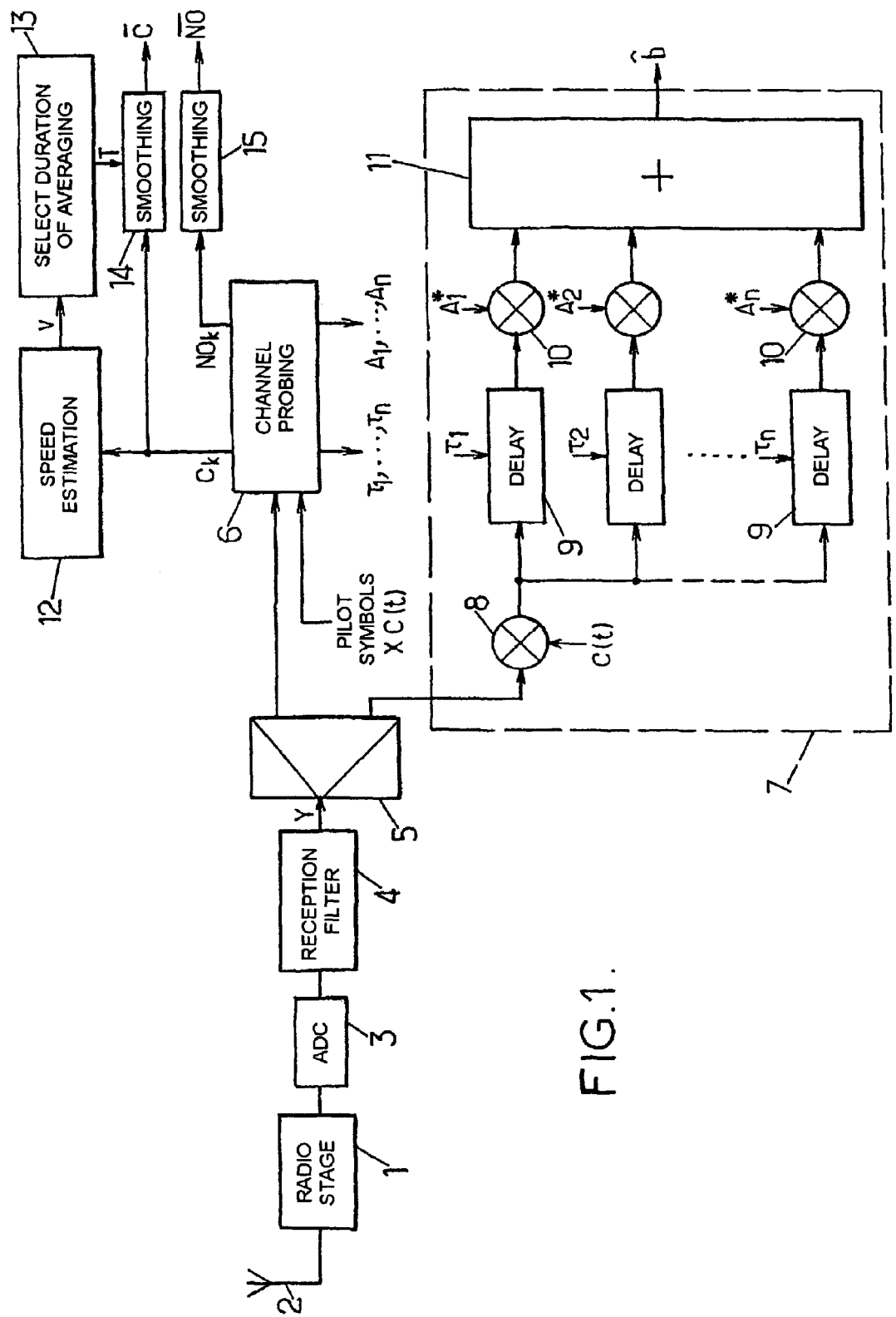
FIG. 1 is a schematic of an exemplary radiocommunication receiver implementing the method according to the invention.

The CDMA receiver represented in FIG. 1 comprises a radio stage 1 which receives the radio signal picked up by the antenna 2 and transposes it to lower frequency. The resulting signal is digitized by an analogue/digital converter 3, then supplied to a reception filter 4. The filter 4 carries out filtering matched to the shaping of the signals by the transmitter. It delivers a digital signal Y at the rate of one complex sample per chip of the spreading codes.

In the case where the pilot symbols are time-multiplexed with the information symbols (the downlink case in the UMTS system), a demultiplexer 5 distributes the signal Y between a channel probing module 6, which operates on the signal corresponding to the pilot symbols, and a rake receiver 7 which processes the remainder of the signal with the aid of parameters characteristic of the channel which are provided by the probing module 6. The pilot symbols may also be located on a different channel than the information symbols (the uplink case in the UMTS system).

The probing module 6 estimates in a manner known per se propagation delays $\tau_1, \ldots \tau_n$ corresponding to multiple propagation paths between the transmitter and the receiver. To do this, it performs a matched filtering of the signal Y by the product of the pilot symbols and spreading code c(t), and it detects the time positions of the n strongest peaks at the output from this matched filter. The complex amplitudes of these spikes $A_1, \ldots, A_n$ are provided to the rake receiver 7 along with the delays $\tau_1, \ldots, \tau_n$.

The receiver 7 also comprises a matched filter 8 which multiplies the signal received Y by the channel spreading code c(t) or its conjugate. Each of the delays $\tau_i$ ($1 \leq i \leq n$) is applied to the output of this matched filter 8, and the signal thus delayed is multiplied by the complex conjugate $A_i^*$ of the complex amplitude $A_i$ provided by the probing module 6. In accordance with the MRC process, the n contributions resulting therefrom are summed by an adder 11 to obtain the estimated information symbols $\hat{b}$.

Among the parameters available in the probing module 6, there is the energy $C_k$ of a signal block received on the n propagation paths considered. This energy $C_k$, referred to the duration of a bit, is given by the sum of the squared moduli of the amplitudes $A_i$:

$$C_k = \frac{1}{N} \sum_{i=1}^{n} \beta_k \cdot |A_i|^2 \qquad (1)$$

where N is the number of pilot symbols of the relevant signal block and $\beta_k$ is a weighting coefficient which takes account of the amplification or of the attenuation introduced, as the case may be, by the transmission power control procedures.

The receiver is thus furnished with an energy measurement sample C per received signal block. In the dedicated channels of the UMTS system, this block corresponds to a time interval of 2560 chips, i.e. 666 μs, and the number N may range from 2 to 16 (see sections 5.2.1 and 5.3.2 of the technical specification 3G TS 25.211 v3.3.0 "Physical channels and mapping of transport channels onto physical channels (FDD) (Release 1999)" published in June 2000 by the 3GPP ("Third Generation Partnership Project")).

On the basis of these measurement samples $C_k$, it is possible to estimate the speed v of movement of the mobile station. This estimation can take place in the mobile station on the basis of the downlink signal, or in the fixed station on the basis of the uplink signal.

The speed estimation can in particular utilize the property that the variance of the first derivative of $C_k$ with respect to time is the additive inverse of the second derivative of the autocorrelation function $R_{CC}(\tau)$ of the energy $C_k$ for a time offset $\tau=0$, this second derivative itself being proportional to the square of the speed. Within the context of the Jake model and for a signal with energy a, the proportionality constant equals $$-\left(\frac{2\pi^2 v^2}{\lambda^2}\right) a^2,$$

$\lambda$ being the radio wavelength used.

In practice, the module 12 can estimate the speed of movement v in the following manner. One is given a duration over which the speed estimation applies, expressed as a number of measurement samples p. The energy a is estimated via the average of the samples $C_k$, indexed by an integer k in equation (2):

$$a = \frac{1}{p} \sum_{k=1}^{p} C_k \qquad (2)$$

The module 12 determines the derived sequence of $C_k$: $D_1, D_2, \ldots D_p$ with $D_k=(C_k-C_{k-1})/T_e$, where $T_e$ is the duration between two measurement samples. The variance of this sequence is estimated by:

$$S = \frac{1}{p} \sum_{k=1}^{p} D_k^2 \qquad (3)$$

The module 12 can then estimate the speed as:

$$v = \frac{1}{\sqrt{2}} \cdot \frac{\lambda}{\pi \cdot a} \cdot \sqrt{S} \qquad (4)$$

The duration $p \cdot T_e$ is typically of the order of magnitude of a second. In practice, the arithmetic averages of relations (2) and (3) may be replaced with an exponential type smoothing with a forgetting factor $\alpha \; \alpha=1/p$.

The standard deviation of a random process with autocorrelation function $R_{XX}$, observed over a duration T is given by:

$$\sigma^2 = \frac{1}{T}\int_{-T}^{T}\left(1 - \frac{\tau}{T}\right)R_{xx}(\tau)d\tau \qquad (5)$$

In the case of Rayleigh fading and for the Jake model, the autocorrelation function of the energy expressed in dB may be written:

$$R_{xx}(\tau) = 5{,}57^2 \times J_0^2\left(\frac{2\pi v \tau}{\lambda}\right) \qquad (6)$$

where $J_0$ denotes the Bessel function of order 0. Consequently, the standard deviation $\sigma$ in dB is given by:

$$\sigma = \sqrt{\frac{2}{T}\int_0^T\left(1 - \frac{\tau}{T}\right) \times 5{,}57^2 \times J_0^2\left(\frac{2\pi v \tau}{\lambda}\right)d\tau} \qquad (7)$$

From this equation (7) we can determine as a function of the speed v the period T of averaging of the energy required in order to achieve a given standard deviation $\sigma$.

Figure 2:
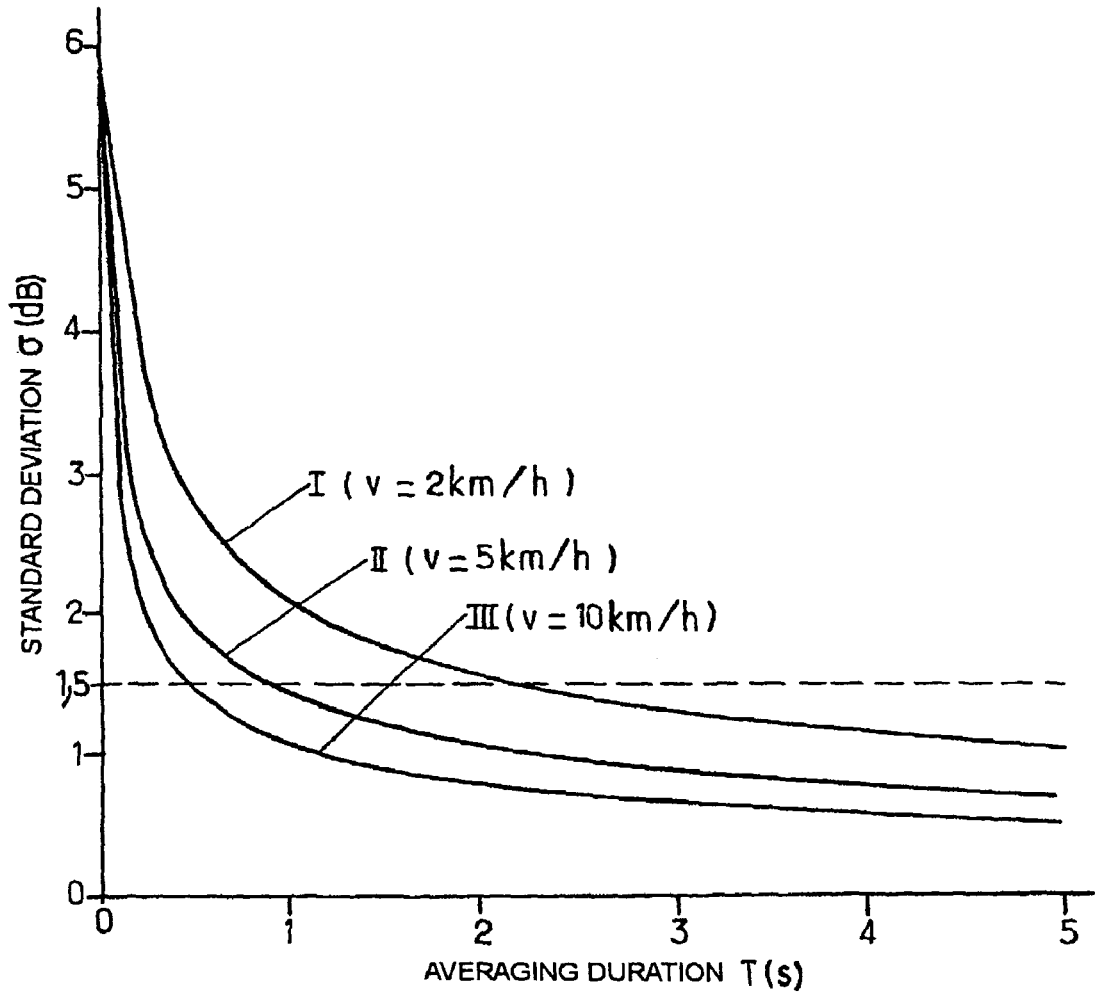
FIG. 2 is a graph illustrating charts usable in the method according to the invention.

Represented in FIG. 2 are three curves I, II, III which correspond to the expression (7) for the standard deviation $\sigma$ as a function of the duration of averaging T for speeds of movement v respectively equal to 2 km/h, 5 km/h and 10 km/h, the wavelength $\lambda$ corresponding to a carrier frequency of 1950 MHz.

If one is given an objective in terms of standard deviation $\sigma$, within the context of a procedure using the averaged measurements of $C_k$, it is then possible, starting from the speed v estimated by the module 12, to determine the duration of averaging T to be taken into consideration.

For example, in the case of FIG. 2, a standard deviation of 1.5 dB in the energy measurement is obtained with an averaging duration which is shorter the larger the speed: T≈2.2 s for v=2 km/h, T≈0.9 s for v=5 km/h and T≈0.4 for v=10 km/h.

This selection of the averaging duration T is performed by the module 13 represented in FIG. 1.

The averaging duration selected by the module 13 can depend on the service to which the signal transmitted pertains. For certain services, it may in fact be justified to target a smaller standard deviation $\sigma$ in the energy measurements than for other services.

For example, in the multimedia context envisaged in UMTS, the services of relatively high throughput travel through channels with low spreading factor. Consequently, to obtain a given transmission quality in terms of binary error rate, these high throughput channels generally have a larger transmission power than the channels with relatively low throughput. Under these conditions, the relative accuracy of the measurements utilized in the power control procedure is more sensitive for these high throughput services. A lower value of standard deviation $\sigma$ will therefore be targeted for the high throughput channels, which entails increasing the averaging duration T, for a given speed.

The selecting of the averaging duration T can be performed by storing tables corresponding to the curves of FIG. 2, and by accessing these tables with the aid of the standard deviation objective a and of the speed v estimated by the module 12. Of course, it is possible to store only a restricted number of values in the tables, completing the missing values by interpolation when necessary. These tables may be made different from one service to another, in particular as a function of the information throughput carried by the signal. The dependence of the duration T as a function of the service is then achieved by selecting the appropriate table on the basis of the current service.

The smoothing of the measurement samples $C_k$ can then be performed by the module 14 represented in FIG. 1, preferably with the aid of an exponential window using a forget factor $\alpha=T_e/T$. The smoothed values $\overline{C}$ resulting therefrom may then be used in various radio link control procedures. If the latter require a lower standard deviation $\sigma$ or are content with a larger standard deviation $\sigma$, the duration T is adjusted accordingly by the module 13.

In a known manner, the channel probing module 6 can also deliver measurement samples $NO_k$ of the noise observed on the channel. These samples may also be smoothed by an exponential window filter 15. To do this, the same forgetting factor $\alpha=T_e/T$ as in the filter 14 is advantageously used.

If the application has a requirement for estimations of the signal/noise ratio, the smoothing may be applied to the quantity $C_k/NO_k$. The energy level taken into account is then normalized with respect to the noise level.

Figure 3:
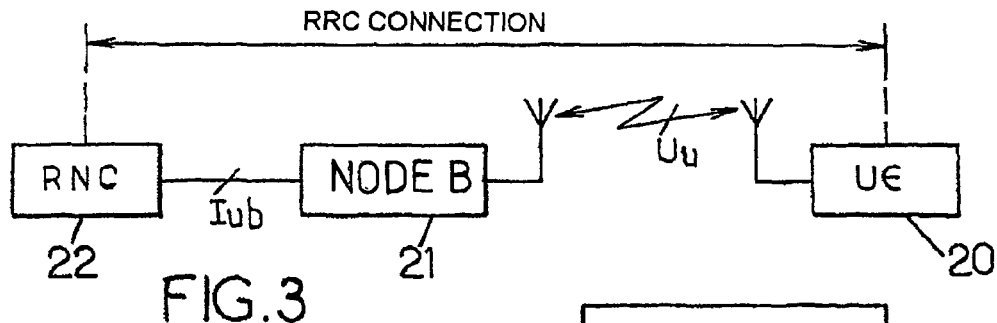
FIG. 3 is diagram illustrating elements of a UMTS type radiocommunication system.

FIG. 3 schematically shows the elements of the UTRAN radio access network (UMTS Terrestrial Radio Access Network) forming part of a UMTS network. UTRAN comprises radio network controllers 22 called RNCs linked through a standardized interface Iub to fixed stations 21 called "node Bs". These fixed stations 21 communicate with the mobile stations 20, called UEs (User Equipment), via CDMA radio links over a standardized interface Uu. The RNCs 22 are linked to a core network (not shown) providing the subscriber management and fixed switching functions.

The physical layer protocols relating to the radio links (layer 1 of the ISO model) are installed mainly at the level of the UE 20 and of the node B(s) 21 with which it is in contact. The radio resource control RRC protocol belongs to a higher layer and is located at the level of the UE 20 and of its serving RNC 22. The RRC instance of the UE 20 communicates with that of its serving RNC 22 by means of an "RRC connection" as described in the technical specification 3G TS 25.331, v3.3.0 "RRC Protocol Specification (Release 1999)" published in June 2000 by the 3GPP.

In general, the radio link control procedures are supervised by the RNC 22 according to the RRC protocol. The module 25 represented in FIGS. 4 to 6 illustrates this RRC layer processing which, within the framework described previously, utilizes the smoothed energy measurements $\overline{C}$.

Figure 4:
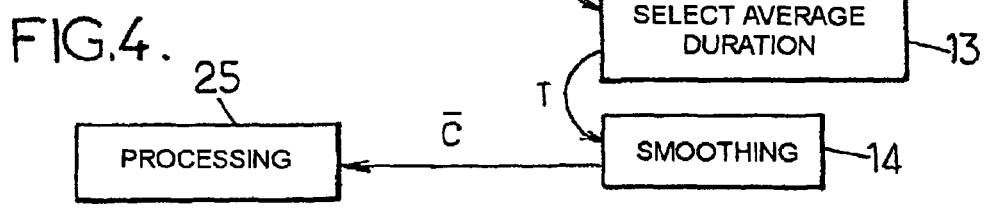
FIGS. 4 to 6 are diagrams illustrating various possible distributions of means used by the method between the elements of FIG. 3.
Figure 5:
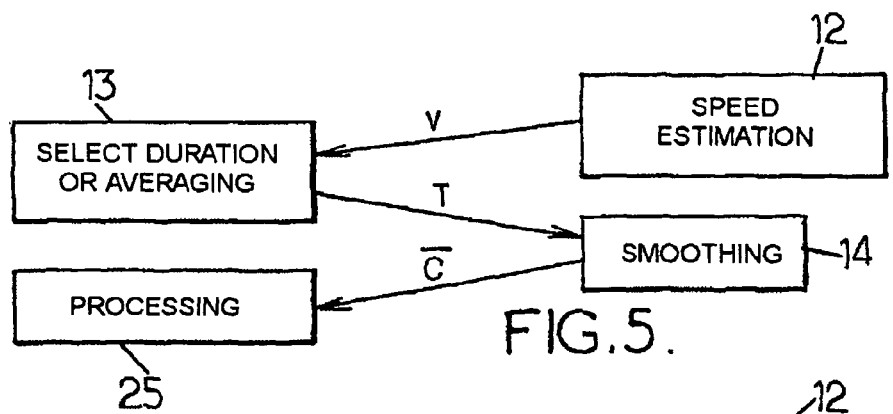
Figure 6:
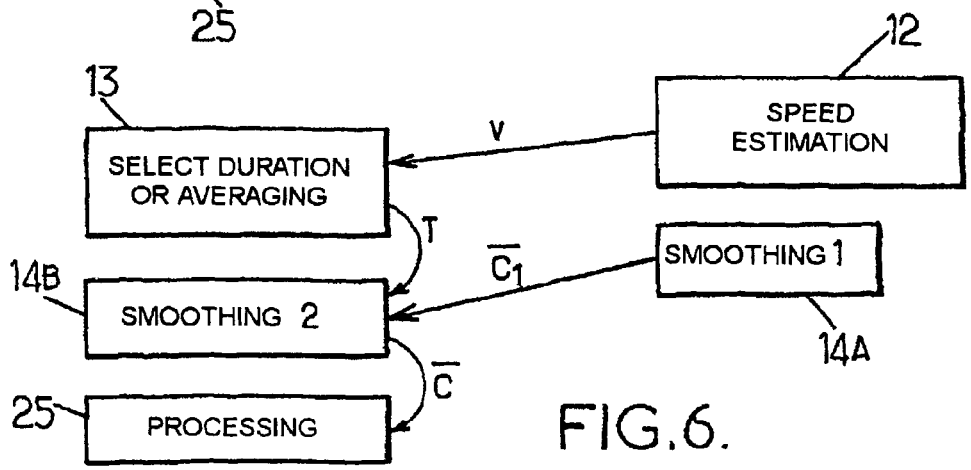

These FIGS. 4 to 6 show that the modules 12, 13, 14 described with reference to FIG. 1 may be distributed in various ways between the communicating entities.

The configuration of FIG. 4 corresponds to the case where these modules 12, 13, 14 are all located in the station receiving the signal whose power is estimated. This station may be the UE 20, in which case the measurements relate to the downlink signals and the smoothed measurements $\overline{C}$ go back up to the RNC 22 by way of the RRC connection. The station equipped with the modules 12, 13, 14 may also be the node B 21, in which case the measurements relate to the uplink signals and the smoothed measurements $\overline{C}$ go back up to the RNC 22 via the Iub interface.

In the configuration of FIG. 5, the speed estimate made by the module 12 in the UE 20 or the node B 21 is transmitted to the module 13, situated in the RNC 22, via the RRC connection or the Iub interface. The RNC then determines the averaging duration T and sends it back to the UE 20 or the node B 21 which comprises the smoothing module 14. This may be performed by adjusting the forgetting factor α, as described in section 8.3.8 of the technical specification 3G TS 25.433, v3.2.0 "UTRAN Iub interface NBAP Signalling (Release 1999)" published in June 2000 by 3GPP, and as described in section 8.5.7.7.2 of the aforesaid 3G TS 25.331 specification in the case of the UE 20. The smoothed measurement $\overline{C}$ obtained by the module 14 is thereafter transmitted to the processing module 25 of the RNC 22.

In the configuration of FIG. 6, the smoothing module 14A situated in the UE 20 or the B node 21 performs a first smoothing of the energy measurement samples $C_k$ with a window of relatively short duration. This duration may be fixed or adjusted according to various criteria by the RNC 22 by means of the mechanism described previously. The smoothed value $\overline{C}_1$ resulting therefrom is conveyed back up to the RNC 22 by the smoothing module 14A of the UE 20 or of the node B 21. The RNC 22 comprises a second smoothing module 14B which applies the averaging duration T selected by the module 13 on the basis of the speed estimate v. This second smoothing module 14B provides the processing module 25 with the smoothed measurement $\overline{C}$ with controlled standard deviation. The averaging duration applied first by the module 14A is tailored to be shorter than the duration T chosen as a function of the speed. This first duration is for example of the order of a few tens to a few hundreds of milliseconds.

It will be noted that the illustrations of FIGS. 4 to 6 are merely possible examples of the implementation of the invention. Other configurations may be envisaged. In particular, the speed estimate v could be obtained by measurement means which are different from those described, or even independent of the received radio signals.

Moreover, the invention is not limited to the UMTS systems considered hereinabove by way of illustration. It applies for example to second-generation systems, of GSM type or the like, where the radio link supervision also utilizes energy measurements made on the received signals.

The invention claimed is:

1. A method in a radiocommunication system of evaluating an energy level of a signal received through a radio interface between radiocommunication stations, said radiocommunication system using a predetermined multiple access scheme and a predetermined signal block structure, the method in said radiocommunication system comprising the steps of:
obtaining successive measurement samples relating to signal blocks, said samples depending on an energy of the received signal, and
calculating an average of said samples to evaluate the energy level, with an averaging duration depending on a service within said radiocommunication system, the received signal pertaining to said service.

2. The method as claimed in claim 1, wherein the averaging duration increases as a function of an information throughput carried by the received signal.

3. The method as claimed in claim 1, wherein the calculation of the average of said samples is performed according to an exponential averaging window with a forgetting factor inversely proportional to said averaging duration.

4. The method as claimed in claim 1, wherein a speed of movement of one the stations is estimated, and the averaging duration further depends on the estimated speed.

5. The method as claimed in claim 4, wherein the speed of movement is estimated on the basis of time variations of the measurement samples.

6. The method as claimed in claim 4, wherein said stations comprise a fixed station receiving said signal from a mobile station whose speed of movement is estimated, and wherein the speed estimation and the average calculation are performed in the fixed station.

7. The method as claimed in claim 4, wherein said stations comprise a fixed station receiving said signal from a mobile station whose speed is estimated, and wherein the average calculation comprises a first averaging performed in the fixed station with a first averaging duration less than said duration dependent on the estimated speed, and a second averaging performed in an item of equipment controlling the fixed station with said averaging duration dependent on the estimated speed.

8. The method as claimed in claim 4, wherein said stations comprise a mobile station receiving said signal from at least one fixed station, and wherein the speed estimation and the average calculation are performed in the mobile station.

9. A method of evaluating an energy level of a signal received from a mobile station by a fixed station through a radio interface between said stations, comprising the steps of:
obtaining successive measurement samples depending on an energy of the received signal,
calculating an average of said samples to evaluate the energy level, and
estimating a speed of movement of the mobile station, wherein the calculation of the average of said samples being performed with an averaging duration depending on the estimated speed, and wherein the average calculation comprises a first averaging performed in the fixed station with a first averaging duration less than said duration dependent on the estimated speed, and a second averaging performed in an item of equipment controlling the fixed station with said averaging duration dependent on the estimated speed.

10. A device in a radiocommunication system for evaluating an energy level of a signal received by a mobile radiocommunication station, said radiocommunication system using a predetermined multiple access scheme and a predetermined signal block structure, the device comprising measurement means for obtaining successive samples relating to signal blocks, said samples depending on an energy of the received signal, and means for calculating an average of said samples to evaluate the energy level controlled to cause a duration of averaging of the samples to depend on a service within said radiocommunication system, the received signal pertaining to said service.

11. The device as claimed in claim 10, wherein the averaging duration increases as a function of an information throughput carried by the received signal.

12. The device as claimed in claim 10, further comprising means for obtaining an estimated speed of movement of the mobile station, and wherein the average calculation means are further controlled to cause said averaging duration to depend on the estimated speed.

13. The evaluating device as claimed in claim 12, wherein the means for obtaining the estimated speed of movement are arranged to estimate the speed on the basis of the time variations of the measurement samples.

14. The device as claimed in claim 10, wherein the average calculation means use an exponential averaging window with a forgetting factor inversely proportional to said averaging duration.

15. A device in said radiocommunication system for evaluating an energy level of a signal received by a fixed radiocommunication station from a mobile station, said radiocommunication system using a predetermined multiple access scheme and a predetermined signal block structure, the device comprising measurement means for obtaining successive samples relating to signal blocks, said samples depending on the energy of the received signal, and means for calculating an average of said samples to evaluate the energy level controlled to cause a duration of averaging of the samples to depend on a service within said radiocommunication system, the received signal pertaining to said service.

16. The device as claimed in claim 15, wherein the averaging duration increases as a function of an information throughput carried by the received signal.

17. The device as claimed in claim 16, further comprising means for obtaining an estimated speed of movement of the mobile station, and wherein the average calculation means are further controlled to cause said averaging duration to depend on the estimated speed.

18. The evaluating device as claimed in claim 17, wherein the means for obtaining the estimated speed of movement are arranged to estimate the speed on the basis of time variations of the measurement samples.

19. The evaluating device as claimed in claim 15, wherein the average calculation means use an exponential averaging window with a forgetting factor inversely proportional to said averaging duration.

* * * * *